(12) United States Patent
Simpkinson et al.

(10) Patent No.: US 11,670,080 B2
(45) Date of Patent: Jun. 6, 2023

(54) TECHNIQUES FOR ENHANCING AWARENESS OF PERSONNEL

(71) Applicant: Vulcan Inc., Seattle, WA (US)

(72) Inventors: Richard Earl Simpkinson, Issaquah, WA (US); Omer Rosenbaum, Kirkland, WA (US); Rusty Allen Gerard, Bothell, WA (US); Keith Rosema, Seattle, WA (US)

(73) Assignee: Vulcan, Inc., Seattle, WA (US)

( * ) Notice: Subject to any disclaimer, the term of this patent is extended or adjusted under 35 U.S.C. 154(b) by 0 days.

(21) Appl. No.: 16/696,969

(22) Filed: Nov. 26, 2019

(65) Prior Publication Data

US 2020/0167569 A1 May 28, 2020

Related U.S. Application Data

(60) Provisional application No. 62/774,035, filed on Nov. 30, 2018, provisional application No. 62/771,560, filed on Nov. 26, 2018.

(51) Int. Cl.
*G06V 20/20* (2022.01)
*G06K 9/62* (2022.01)
*G06V 20/40* (2022.01)

(52) U.S. Cl.
CPC .......... *G06V 20/20* (2022.01); *G06K 9/6256* (2013.01); *G06K 9/6277* (2013.01); *G06V 20/41* (2022.01); *G06V 20/44* (2022.01)

(58) Field of Classification Search
CPC ............. G06K 9/00671; G06K 9/6256; G06K 9/6277; G06V 20/20; G06V 20/41; G06V 20/44
See application file for complete search history.

(56) References Cited

U.S. PATENT DOCUMENTS

| | | | |
|---|---|---|---|
| 6,080,063 | A | 6/2000 | Khosla |
| 8,384,542 | B1 | 2/2013 | Merrill et al. |
| 9,317,916 | B1 | 4/2016 | Hanina et al. |
| 9,782,668 | B1 | 10/2017 | Golden et al. |
| D817,195 | S | 5/2018 | Iyengar |
| 10,143,925 | B2 | 12/2018 | Middleton |
| 10,192,126 | B2 | 1/2019 | Yamanaka et al. |

(Continued)

FOREIGN PATENT DOCUMENTS

| CN | 107897068 A | 4/2018 | |
|---|---|---|---|
| WO | WO 2007002763 A2 * | 1/2007 | ............... H04N 7/18 |

OTHER PUBLICATIONS

International Search Report and Written Opinion dated Jul. 23, 2020, Patent Application No. PCT/US2020/016882, 19 pages.

(Continued)

*Primary Examiner* — Ryan R Yang

(74) *Attorney, Agent, or Firm* — Davis Wright Tremaine LLP

(57) ABSTRACT

An augmented-reality system classifies a subject observed in video data obtained from a first area. A goal of a user of an augmented reality device is determined based on video data obtained from a second area. A correlation between the goal of the user and the classification of the subject is determined. An augmented reality display is generated to include a visual indicia of the subject, the visual indicia generated to represent the correlation between the goal and the classification.

20 Claims, 10 Drawing Sheets

(56) References Cited

U.S. PATENT DOCUMENTS

| | | |
|---|---|---|
| 10,279,264 B1 | 5/2019 | Aghdaie et al. |
| 10,579,869 B1 | 3/2020 | Xiong et al. |
| 10,675,536 B2 | 6/2020 | Chen |
| 10,839,203 B1 | 11/2020 | Guigues et al. |
| 11,036,303 B2 | 6/2021 | Rani et al. |
| 11,132,606 B2 | 9/2021 | Taylor |
| 11,249,179 B2 | 2/2022 | Hamasaki et al. |
| 11,337,358 B2 | 5/2022 | Fletcher et al. |
| 2006/0223635 A1 | 10/2006 | Rosenberg |
| 2008/0170123 A1 | 7/2008 | Albertson et al. |
| 2009/0005140 A1 | 1/2009 | Rose et al. |
| 2011/0216060 A1 | 9/2011 | Weising et al. |
| 2011/0298827 A1 | 12/2011 | Perez |
| 2011/0301934 A1 | 12/2011 | Tardif |
| 2012/0079990 A1 | 4/2012 | Fuhr et al. |
| 2012/0083325 A1 | 4/2012 | Heatherly |
| 2012/0243375 A1 | 9/2012 | Melvin, II et al. |
| 2012/0281181 A1* | 11/2012 | Chen ............ H04N 13/366 351/159.03 |
| 2013/0077820 A1 | 3/2013 | Marais et al. |
| 2014/0032034 A1 | 1/2014 | Raptopoulos et al. |
| 2014/0153794 A1 | 6/2014 | Varaklis et al. |
| 2014/0253590 A1* | 9/2014 | Needham ............ G06K 9/00671 345/633 |
| 2014/0267008 A1 | 9/2014 | Jain et al. |
| 2014/0310595 A1* | 10/2014 | Acharya ............ G06F 3/04842 715/706 |
| 2015/0177842 A1 | 6/2015 | Rudenko |
| 2016/0078289 A1 | 3/2016 | Michel et al. |
| 2016/0086349 A1 | 3/2016 | Shotton et al. |
| 2016/0180468 A1* | 6/2016 | Buss ............ G06K 9/00691 705/4 |
| 2016/0243434 A1 | 8/2016 | Yim et al. |
| 2016/0328604 A1 | 11/2016 | Bulzacki |
| 2017/0144756 A1 | 5/2017 | Rastgaar Aagaah et al. |
| 2017/0148339 A1 | 5/2017 | Van Curen et al. |
| 2017/0168586 A1 | 6/2017 | Sinha et al. |
| 2017/0190051 A1* | 7/2017 | O'Sullivan ............ G06N 20/00 |
| 2017/0193708 A1 | 7/2017 | Lyons et al. |
| 2017/0208493 A1 | 7/2017 | Masson et al. |
| 2017/0212210 A1 | 7/2017 | Chen et al. |
| 2017/0280678 A1 | 10/2017 | Jones et al. |
| 2017/0293742 A1 | 10/2017 | Sadeghi et al. |
| 2017/0293824 A1* | 10/2017 | Chen ............ G06F 16/5838 |
| 2017/0313421 A1 | 11/2017 | Gil |
| 2017/0344859 A1 | 11/2017 | Mo |
| 2017/0358144 A1 | 12/2017 | Schwarz et al. |
| 2018/0018861 A1* | 1/2018 | Locke ............ H04N 13/204 |
| 2018/0024641 A1 | 1/2018 | Mao et al. |
| 2018/0093186 A1 | 4/2018 | Black et al. |
| 2018/0122043 A1* | 5/2018 | Energin ............ A63F 13/428 |
| 2018/0213713 A1 | 8/2018 | Zito, Jr. et al. |
| 2018/0263170 A1 | 9/2018 | Aghai et al. |
| 2019/0000350 A1 | 1/2019 | Narayan et al. |
| 2019/0038222 A1* | 2/2019 | Krimon ............ A61F 5/013 |
| 2019/0061890 A1 | 2/2019 | Fiorello |
| 2019/0091582 A1 | 3/2019 | Reiche, III et al. |
| 2019/0124893 A1 | 5/2019 | Bolen |
| 2019/0217198 A1 | 7/2019 | Clark et al. |
| 2019/0221035 A1 | 7/2019 | Clark et al. |
| 2019/0294881 A1* | 9/2019 | Polak ............ G06V 20/52 |
| 2019/0325605 A1* | 10/2019 | Ye ............ G06T 7/73 |
| 2019/0383903 A1 | 12/2019 | Chao et al. |
| 2020/0005028 A1 | 1/2020 | Gu |
| 2020/0050342 A1 | 2/2020 | Lee |
| 2020/0057425 A1 | 2/2020 | Seibert et al. |
| 2020/0160535 A1* | 5/2020 | Ali Akbarian ......... G06N 5/046 |
| 2020/0238177 A1 | 7/2020 | Black et al. |
| 2020/0289922 A1 | 9/2020 | McCoy et al. |
| 2020/0394393 A1 | 12/2020 | Kraft et al. |

OTHER PUBLICATIONS

International Invitation to Pay Additional Fees dated Jun. 2, 2020, in International Patent Application No. PCT/US2020/016882, filed Feb. 5, 2020, 21 pages.

Charles, "GPS Goes Mainsteam," NPR, Dec. 26, 2007, 7 pages.

Langley et al., "Approaches to Machine Learning," Department of Computer Science Carnegie-Mellon University, Feb. 16, 1984, 28 pages.

* cited by examiner

TECHNIQUES FOR ENHANCING AWARENESS OF PERSONNEL

CROSS-REFERENCE TO RELATED APPLICATIONS

This application claims the benefit of U.S. Provisional Patent Application No. 62/771,560, filed Nov. 26, 2018, and of U.S. Provisional Patent Application No. 62/774,035, filed Nov. 30, 2018, the disclosures of which are herein incorporated by reference in their entirety.

BACKGROUND

Augmented reality is a relatively new technology which involves incorporating computer-generated graphics into a view of a user's real physical environment. Typically, augmented reality applications are performed with devices such as smartphones or goggles, which incorporate a camera for capturing an image of the user's physical environment, and a display for presenting the augmented view. Fields that may benefit from the augmented reality include those fields related to safety, security, and rescue.

BRIEF DESCRIPTION OF THE DRAWINGS

Various techniques will be described with reference to the drawings, in which.

DETAILED DESCRIPTION

Techniques and systems described below relate to enhancing the perceptional abilities of a user of an augmented reality device user. The described techniques include techniques for presenting a user with information that may enhance their perception of conditions in various environments. These include geographic locations, such as office buildings, parks, shops, and other public spaces where enhanced perception may improve the safety and security of individuals in the environment.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1:
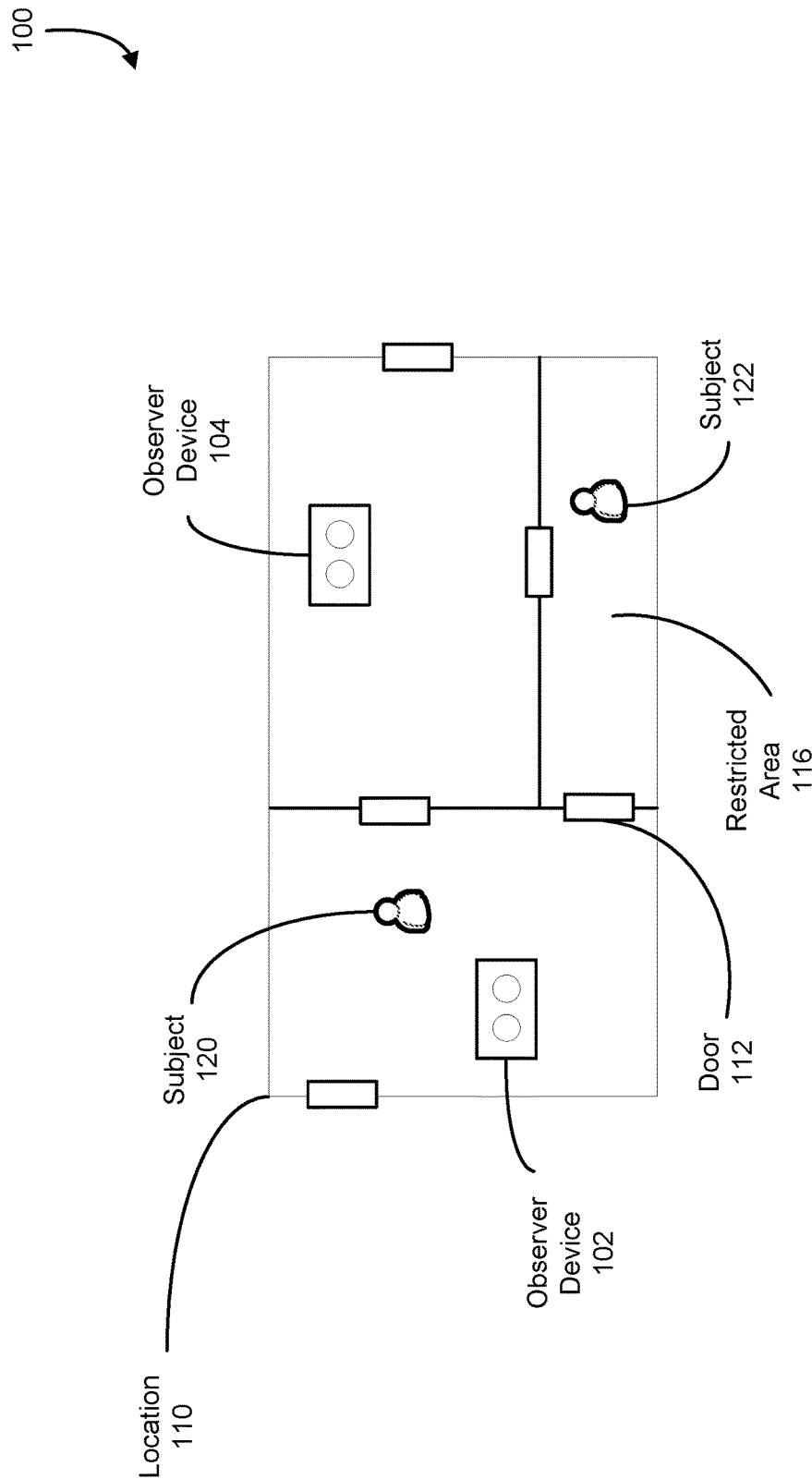
FIG. 1 illustrates an example of enhancing observer perception of activities at a location, in accordance with an embodiment.
Figure 10:
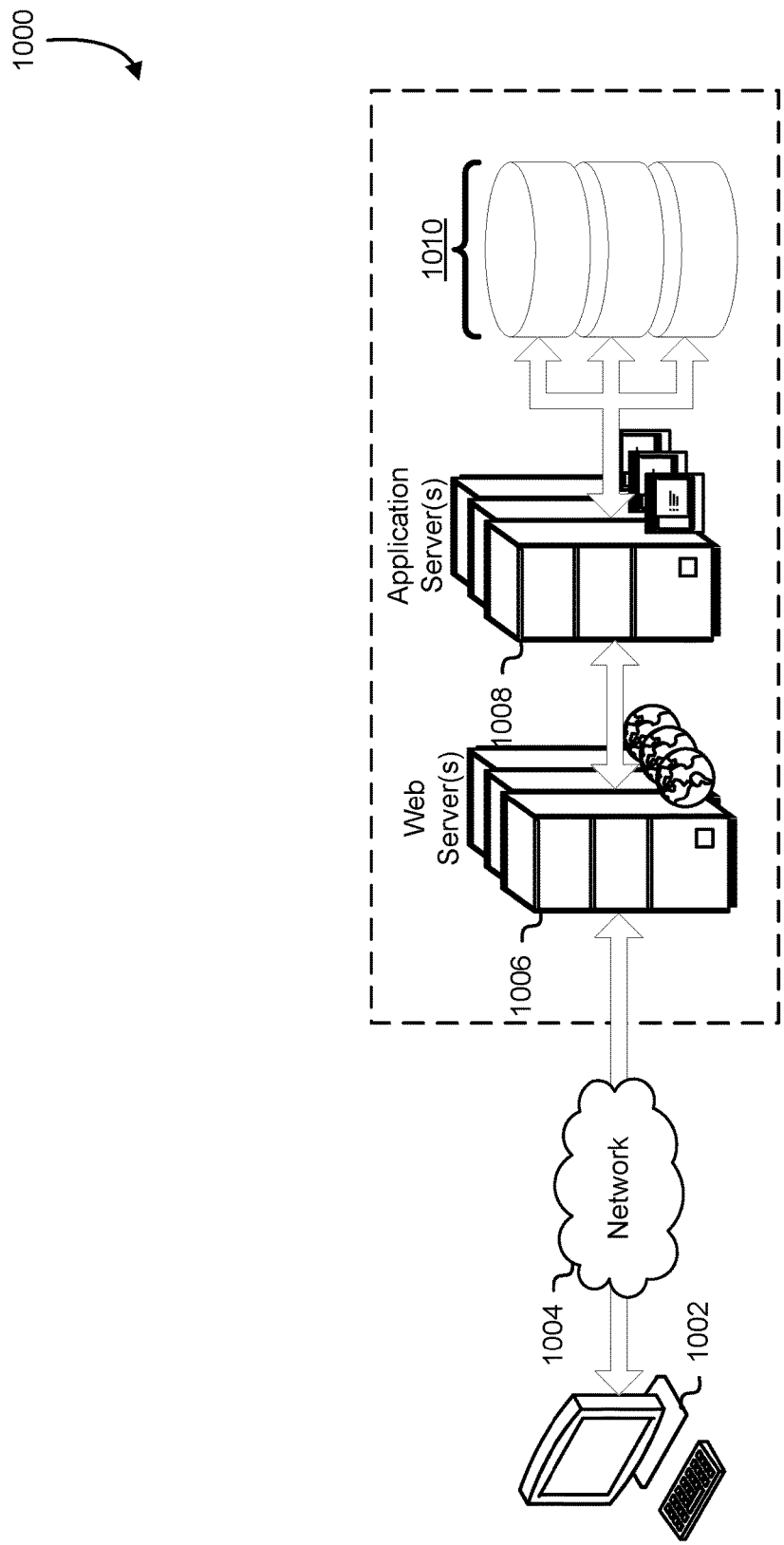
FIG. 10 illustrates an environment in which various embodiments can be implemented.

FIG. 1 illustrates an example of enhancing observer perception of activities at a location, in accordance with an embodiment. In the example 100, a system for enhancing observer perception is depicted. The system comprises observer devices 102, 104 connected, via a wireless network, to a cloud-based system configured to enhance observer perception. An example of a cloud-based system is depicted by FIG. 10.

An observer device 102 may include an augmented reality device. An augmented reality device may comprise one or more cameras for capturing visual information, a processor, and at least one memory comprising instructions for performing operations described herein in relation to an observer device. The instructions, when executed by the processor, cause the observer device to perform the indicated function. In some embodiments, the one or more of the observer devices 102, 104 are wearable and/or portable devices, such as augmented reality goggles. In some embodiments, one or more of the observer devices 102, 104 are fixed devices, such as wall or ceiling mounted cameras.

In at least one embodiment, one or more of the observer devices are be cameras connected to a computing device, or which include computing devices. The cameras may also be connected to a network and able to transmit still image data or moving image data.

In at least one embodiment, one or more of the observer devices 102, 104 is an augmented reality device. For example, one or more of the observer devices 102, 104 is a pair of augmented reality goggles. Using the techniques described herein, an augmented reality display, or scene, may be generated to include visual indicia. The visual indicia, in at least one embodiment, conveys information which enhances the perception of the user. For example, in at least one embodiment, an augmented reality display, or scene, is generated to include visual indicia of a subject observed in an environment, even when the subject might otherwise be occluded from the user's view. For example, a visual indicia of a subject might be overlaid onto a doorway between a first area where the subject is located and a second area where the user of the augmented reality device is located. The visual indicia notifies the user of the subject's presence, even though the subject is occluded from the user's view.

The observer devices 102 communicate with each other, either directly or indirectly. Example communications methods for the two devices include wireless networks, wireless optical networks, short-range radio networks, long-range radio networks, and so forth. Communication may be performed via an intermediary process component of the cloud-based system.

In the example 100 of FIG. 1, a location 110 comprises several rooms connected by doorways, archways, or other passageways or portals. The location 110 may include a restricted area 116. Access to the restricted area may, for example, be controlled via various security mechanisms, such as a "card key" or biometric system which controls whether or not the door to the restricted area 116 is to be unlocked.

Each of the observer devices 102, 104 may observe subjects 120, 122 as they travel about the location 110. For example, observer device 102 may observe a subject 120 as the subject 120 enters the location 110 via an external doorway. Likewise, another observer device 104 may observe a subject 122 as the subject 122 enters the restricted area 116.

In at least one embodiment, the system depicted in FIG. 1 is used to provide enhanced perception to a user of one of the observer devices 102, 104 in ways described herein. For example, a user of an observer device 104 in a first area might be provided with enhanced perception features regarding subjects 120, 122 that have been observed in areas not directly visible to the user.

In at least one embodiment, enhanced perception is provided to a user of an observer device based on information obtained from a classification of observed subjects 120, 122. For example, a subject 120 might be identified and classified as "known" or "authorized" to be in the location 110, or in the restricted area 116. The subject 122, meanwhile, might be classified as an "unknown" individual, or as a known but unauthorized individual.

In an embodiment, enhanced perception is provided to an observer device user by displaying, to an observer device, information about the classification. Moreover, if a subject 120, 122 is identified, additional information about a subject 120, 122 might be displayed on an observer device 102, 104.

In an embodiment, enhanced perception is provided to an observer device user by sharing information concerning classification, observed subjects, and so forth. For example, the observer device 102 might display a summary of information collected by the other observer device 104. This could include, in some cases, information indicating that an unidentified individual was spotted entering the restricted area 116. The observer device 102 might so indicate, in augmented reality, by displaying a notice projected over the door 112, to indicate that an unidentified user is believed to be located behind the door.

Figure 2:
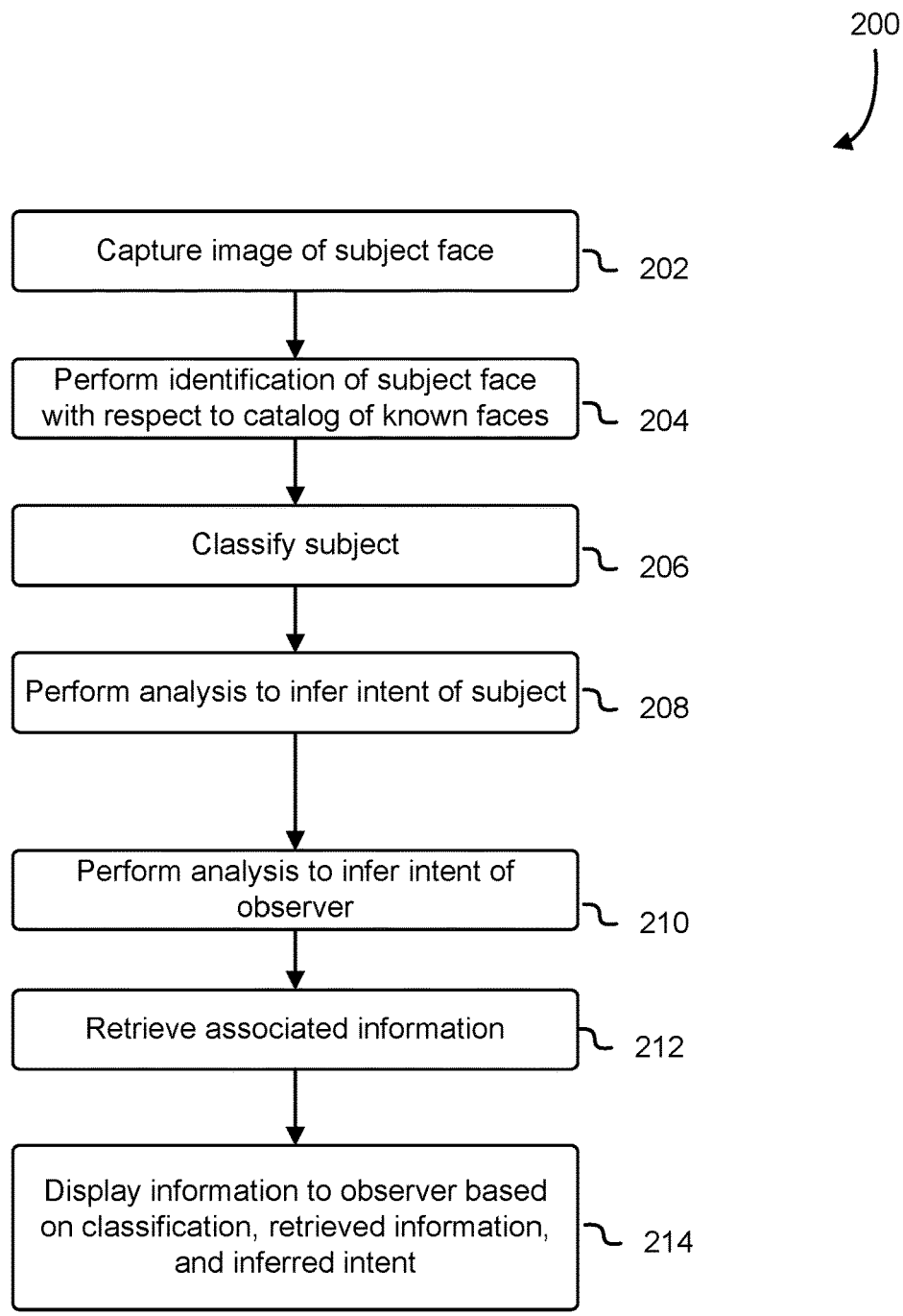
FIG. 2 illustrates an example process of displaying classification information to an observer, in accordance with an embodiment.

FIG. 2 illustrates an example process of displaying classification information to an observer, in accordance with an embodiment. Some or all of the process 200 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 200 may be performed by any suitable system comprising the observer devices depicted in FIG. 1, and/or other devices, such as a server in a data center, by various components of the environment 1000 described in conjunction with FIG. 10, such as the one or more web servers 1006 or the one or more application servers 1008, by multiple computing devices in a distributed system of a computing resource service provider, or by any electronic client device such as the electronic client device 1002.

In 202, an observer device captures the image of a subject's face. In 204, the system performs identification of the subject's face, with respect to a catalog of known faces. The catalog may be hosted by or accessible from a cloud-based services, such as the application servers 1008 and or databases 1010 depicted in FIG. 10. The information in the catalog may comprise mappings from facial information, such as facial recognition data, to information about the identity of the corresponding person.

In 206, the system classifies the observed subject. Once identification is attempted, an observed person may be assigned a classification by the system. In an embodiment, an observed person is classified as known or unknown, where a "known" individual corresponds to a person whose identity could be confirmed. The system might also categorized a recognized subject as "authorized" or "unauthorized," where authorized individuals are those whose security credentials indicate that they are permitted to be on the premises, and unauthorized individuals are those who are not. Embodiments might also provide more refined classification, such as "authorization status unknown," "authorized in public areas," and so forth.

In 208, the system performs an analysis to infer the intent of the observed subject. The system may infer intent through a variety of techniques, including but not limited to various the application of various machine learning techniques. Here, inference of intent refers to an inferred purpose of a subject. For example, in a publicly accessible store, the intent of most individuals might be inferred to be "shopping," while some individuals—perhaps those explicitly recognized based on a database of employees—might have their intent classified as "performing a cashier function," or "stocking shelves," and so forth.

In 210, the system performs analysis to infer the intent of a user of the observer device. For example, the user might be a security guard performing a routine patrol of a location, investigating an incident, responding to a fire alarm, and so forth. Alternatively, the user might be some other employee performing a different function. In at least one embodiment, the intent of a user maps to an entry in a set of intent classifications. The set may depend upon context. For example, when an embodiment is used by an employee at a retail establishment, intent may be mapped to the set {CASHIER, CUSTOMER ASSISTANT, MANAGER}, to use one possible example. The context, from which intent can be inferred, may also depend upon location. For example, when the user is in a storage area, the intent might be mapped to an entry in the set {RESTOCKING, INVENTORY, REORDERING}, to use one possible example.

In 212, the system retrieves associated information. Here, the associated information refers to information associated with the identities and classifications of the subjects, the inferred intent of the subjects and the observer device user, and information pertaining to the location or a current situation at the location. For example, facts about an identified subject might be obtained, or facts about an intent obtained. Regarding the latter, one further aspect of this example might be obtaining information useful to someone with the particular inferred intent. For example, if intent is inferred to be RESTOCKING, the system might obtain information indicating which items need to be restocked.

In 214, the system displays information to the observer, based on the classification, retrieved information, and inferred intent. For example, the system might provide a security guard on patrol with information indicating how various individuals on the premises have been classified. If the security guard is responding to a fire alarm, the system might provide the user with information indicating where the alarm is and what aspects of the situation might require further investigation.

Figure 3:
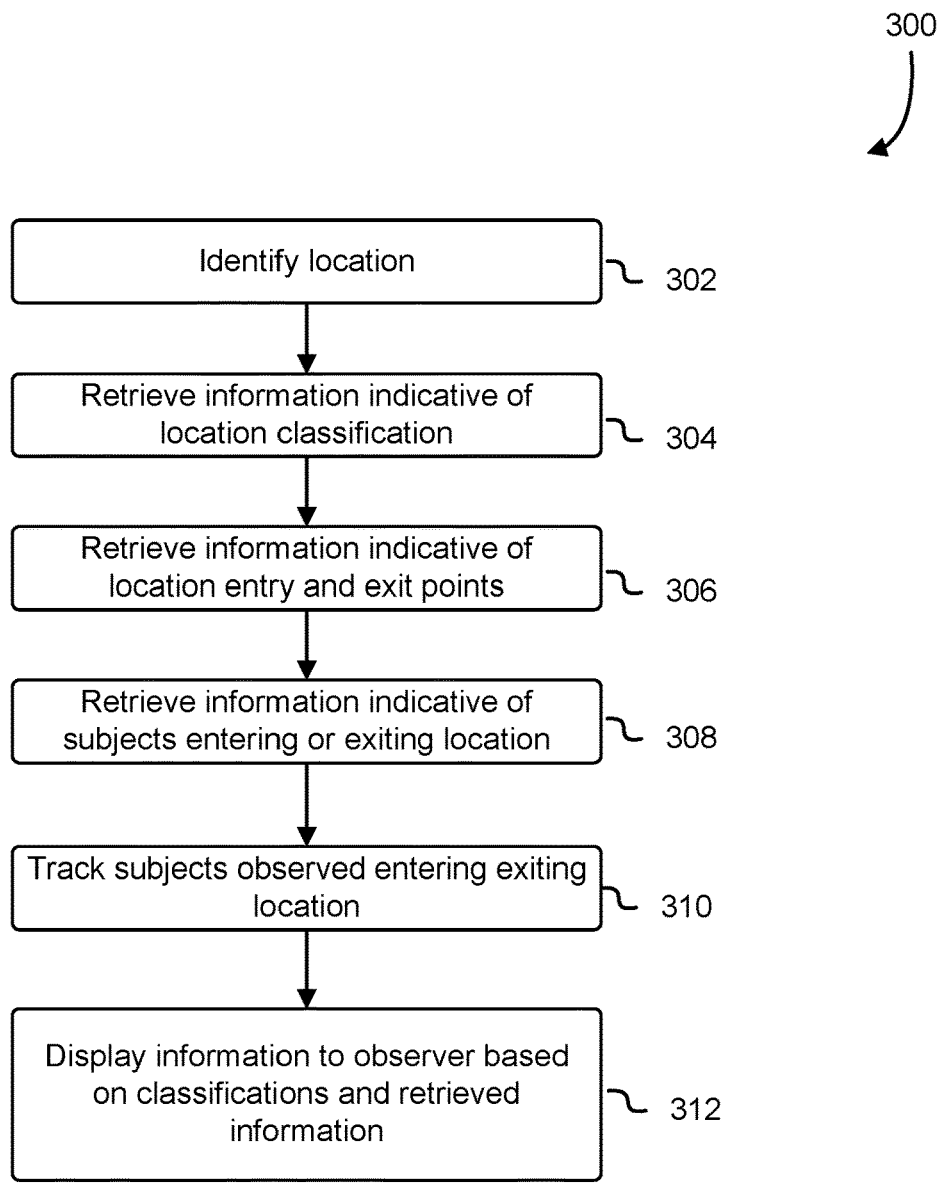
FIG. 3 illustrates further aspects of an example process of displaying classification information to an observer, in accordance with an embodiment.

FIG. 3 illustrates further aspects of an example process of displaying classification information to an observer, in accordance with an embodiment; Some or all of the process 300 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 300 may be performed by any suitable system comprising the observer devices depicted in FIG. 1, and/or other devices, such as a server in a data center, by various components of the environment 1000 described in conjunction with FIG. 10, such as the one or more web servers 1006 or the one or more application servers 1008, by multiple computing devices in a distributed system of a computing resource service provider, or by any electronic client device such as the electronic client device 1002.

In 302, the system identifies the location in which an observer device is operative, and in 304, the system retrieves information indicative of a location classification. For example, the system may retrieve a map or other digital representation of the area, such that the system is able to correlate the location of an observer device user or a subject with a location on the map. The system might also retrieve information indicating whether or not a particular area is restricted.

In 306, the system retrieves information indicative of location entry and exit points. The system may infer intent, and provide other status indicators, to a user based on entry and exit points. For example, the intent of an unauthorized individual may be inferred as "negative" or "hostile" if an unauthorized individual crosses a threshold into a restricted area. Moreover, a subject crossing a threshold may trigger further analysis of intent, or trigger other operations such as recording additional information for later use. For example, the system may keep track of users currently believed to be in an area by recording when they enter or exit through a doorway.

In 308, the system retrieves information indicative of subject entering or exiting the location, and at 310, the system classifies the subjects observed at the location. For example, the system may perform a re-classification, or perform an initial classification, of a subject when they first enter a restricted area.

In 310, the system tracks subjects observed entering or exiting the location. This may be done so that the system can provide, to observer device users, information indicating how many people are at a particular location, how those users are classified, and so forth.

In 312, the system displays information to the user based on the classifications and the retrieved information. For example, in an embodiment a user of an observer device is presented, prior to entering a room, with summary information indicating whether or not any individuals are believed to be present in the room the user is about to enter.

Figure 4:
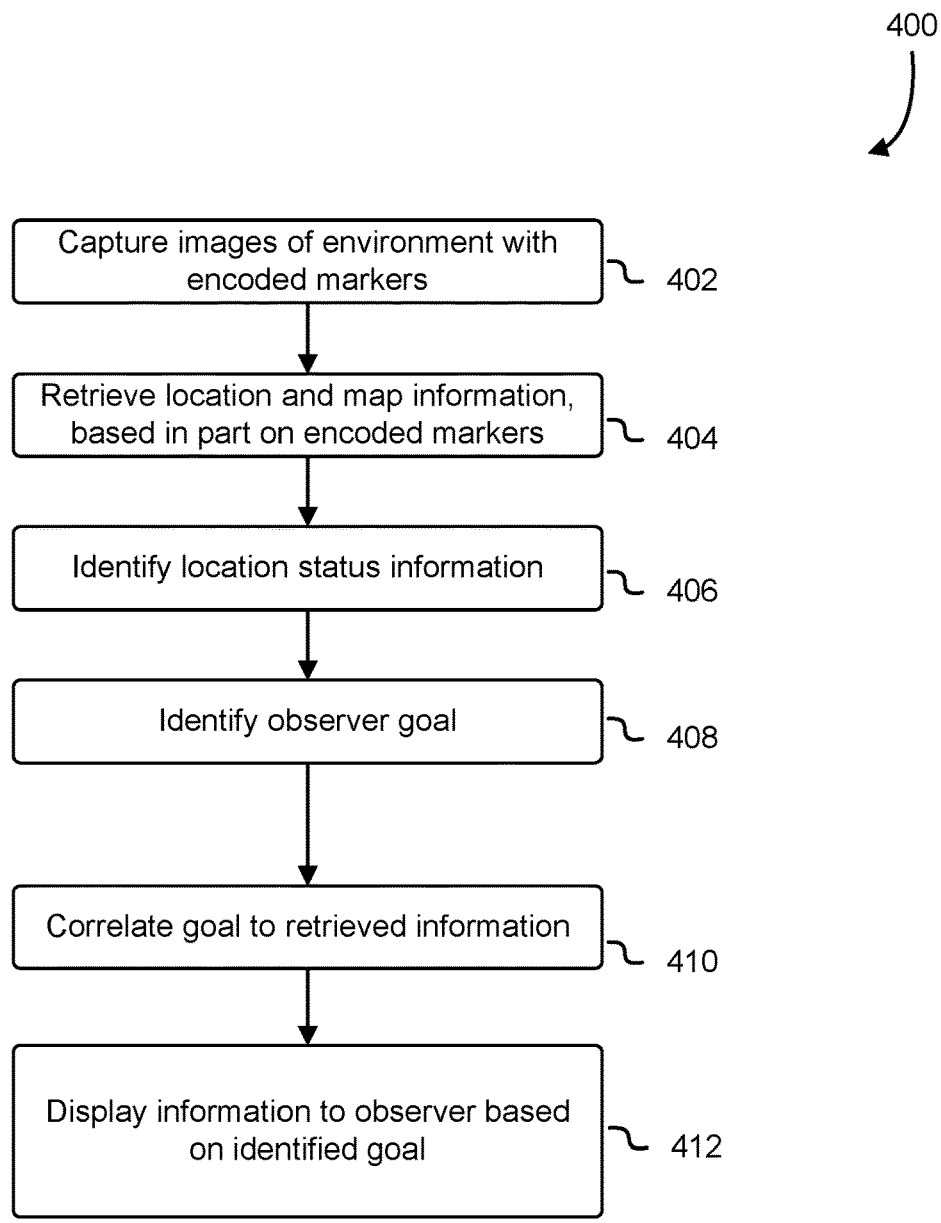
FIG. 4 illustrates further aspects of an example process of enhancing observer perception of goal steps, in accordance with an embodiment.

FIG. 4 illustrates further aspects of an example process of enhancing observer perception of goal steps, in accordance with an embodiment; Some or all of the process 400 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 400 may be performed by any suitable system comprising the observer devices depicted in FIG. 1, and/or other devices, such as a server in a data center, by various components of the environment 1000 described in conjunction with FIG. 10, such as the one or more web servers 1006 or the one or more application servers 1008, by multiple computing devices in a distributed system of a computing resource service provider, or by any electronic client device such as the electronic client device 1002.

In 402, the system captures images of the location and its environs using markers encoded into the environment. For example, a physical environment (such as a building) may have various printed codes located throughout. These may be conspicuous or hidden in the environment. Examples of such codes include quick response code ("QR codes"), matrix barcodes, or other means of encoding information in the physical environment, such that the information may be retrieved by an augmented reality device and/or an associated peripheral. In addition, everyday objects may also be used, if they have distinguishing aspects. For example, a particular area might include a statue, printed poster, or furniture piece that is recognizable and unique, at least within the areas that are being monitored.

In 404, the system retrieves location and map information based at least in part on the encoded markers. The encoded markers may, for example, trigger the retrieval of information describing the physical layout of a building, which portions of the building are restricted, and so forth. In some cases, the system can also retrieve information about specific things within the environment.

In 406, the system identifies or otherwise determines location status information. This can include information pertinent to the particular location in which a user is located. The location of the user may be determined, for example, based on a QR code located at the doorway to the user's present location, or by global positioning data, or some other method, individually or in combination.

In 408, the system identifies an observer goal. The observer may be the user of an augmented reality device. Alternatively, the observer may be someone viewing a video feed. As noted, this may involve determining what task or activity the user is engaged in. In some instances, the observer device is sent messages indicating a current goal. For example, the device might be sent a task list including such items as "investigate fire alarm," "patrol building perimeter," and so forth. The user may, in some cases, selected from a list to indicate which task he is engaged in. In other instances, machine learning or other techniques may be used to determine what the user is engaged in. Thereafter, an intent may be inferred by a machine learning algorithm, or other technique. For example, if the user enters a room where a fire alarm was reported, it might be inferred, via a machine learning technique that identifies correlations, that the user is investigating the fire alarm.

In 410, the system correlates the goal to the retrieved information. This includes identifying information relevant to the goal, prioritizing display of the information, and so forth. Based on the correlation, the system then, at 412, displays information to the user, based on the identified goal and the retrieved information.

Figure 5:
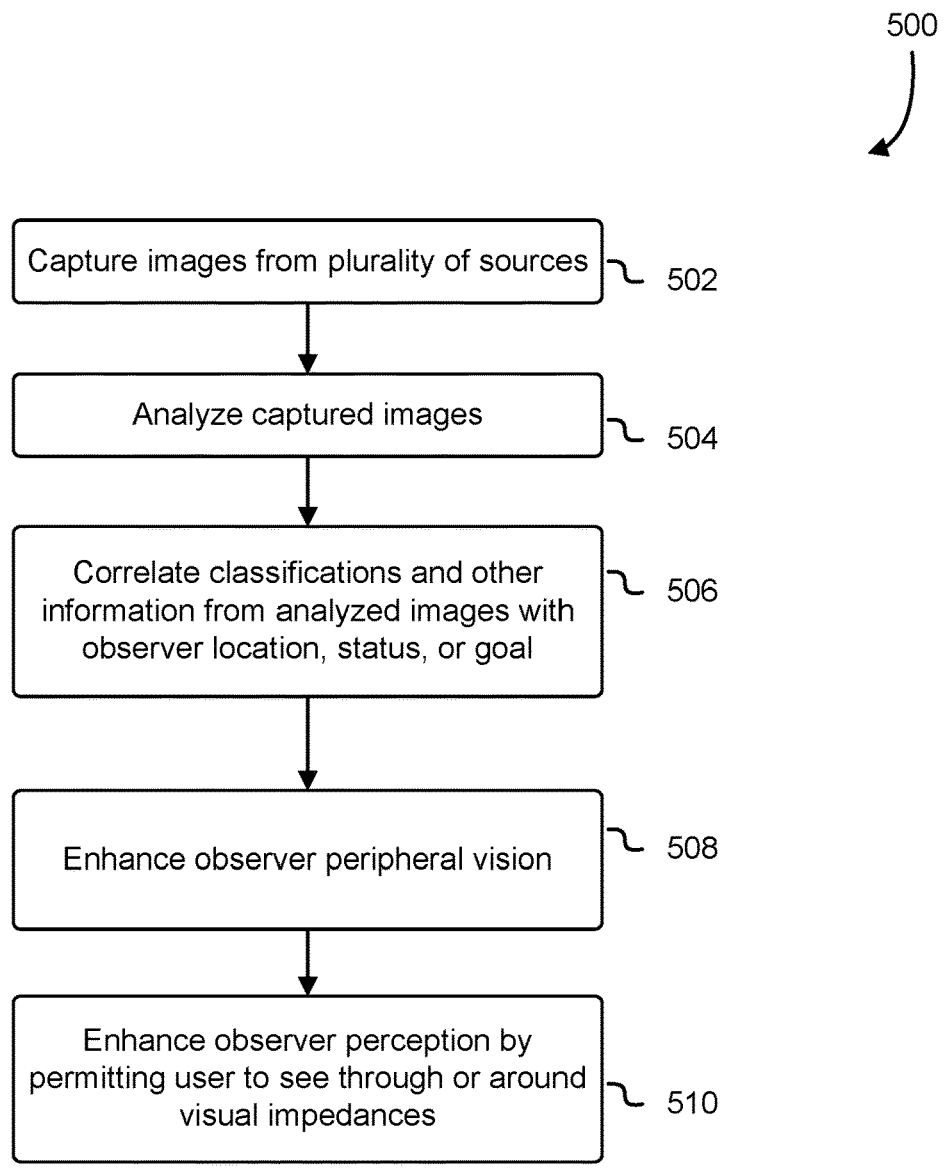
FIG. 5 illustrates further aspects of an example process of enhancing observer perception around visual impedances, in accordance with an embodiment.

FIG. 5 illustrates further aspects of an example process of enhancing observer perception around visual impedances, in accordance with an embodiment; Some or all of the process 500 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 500 may be performed by any suitable system comprising the observer devices depicted in FIG. 1, and/or other devices, such as a server in a data center, by various components of the environment 1000 described in conjunction with FIG. 10, such as the one or more web servers 1006 or the one or more application servers 1008, by multiple computing devices in a distributed system of a computing resource service provider, or by any electronic client device such as the electronic client device 1002.

In 502, the system captures images from a plurality of sources. This step may be performed by a single observer device, by a plurality of observer devices, or by one or more observer devices and one or more additional devices. For example, with reference to FIG. 1, each of the observer devices 102, 104 may capture various images as their users move about the location.

In 504, the system analyzes the captured images. This step may include performing facial recognition and other analysis types. Then, in 506, the system correlates classifications (and other information obtained by analyzing the captured images) with information such as observer location, observer status, or observer goal. For example, the system might infer that a user of an observer device 102 is preparing to investigate the restricted area 116. Based on this inferred intent, and other information, the system can display additional information to the user in order to enhance the users perception of the environment and the events occurring in the environment.

For example, in 508, the system enhances observer perception by improving peripheral vision. In some cases, for instance, the system might indicate that an unknown individual has entered a room outside the immediate range of the user's vision. This could be done, for example, by displaying a flashing arrow on the appropriate edge of the observer device's display.

In another example, as depicted in 510, the system enhances observer perception by permitting the user to see through or around visual impedances. With reference to FIG. 1, the system might render the door 112 such that it includes information indicating that a subject 122 is located on the other side of the door. If a camera or another observer device is located inside the restricted area 116, a "live" view of the environment might be presented or simulated, such that the door 112 appears invisible or is partially translucent.

Although not explicitly depicted in FIG. 5, observer perception might be enhanced in a number of other ways. For example, the system might provide transcriptions of conversations held by a particular individual, provided that the recording of such conversations is permitted. In some embodiments, the use of an observer device might be presented, via the device, with information showing the path that a subject used to move throughout a building.

In an embodiment, information from additional sources is considered and used to enhance observer perception. For example, if a pattern of events has been observed at similar locations (such as other stores), the user of an observer device at the present, similar location, might be informed of the pattern.

Figure 6:
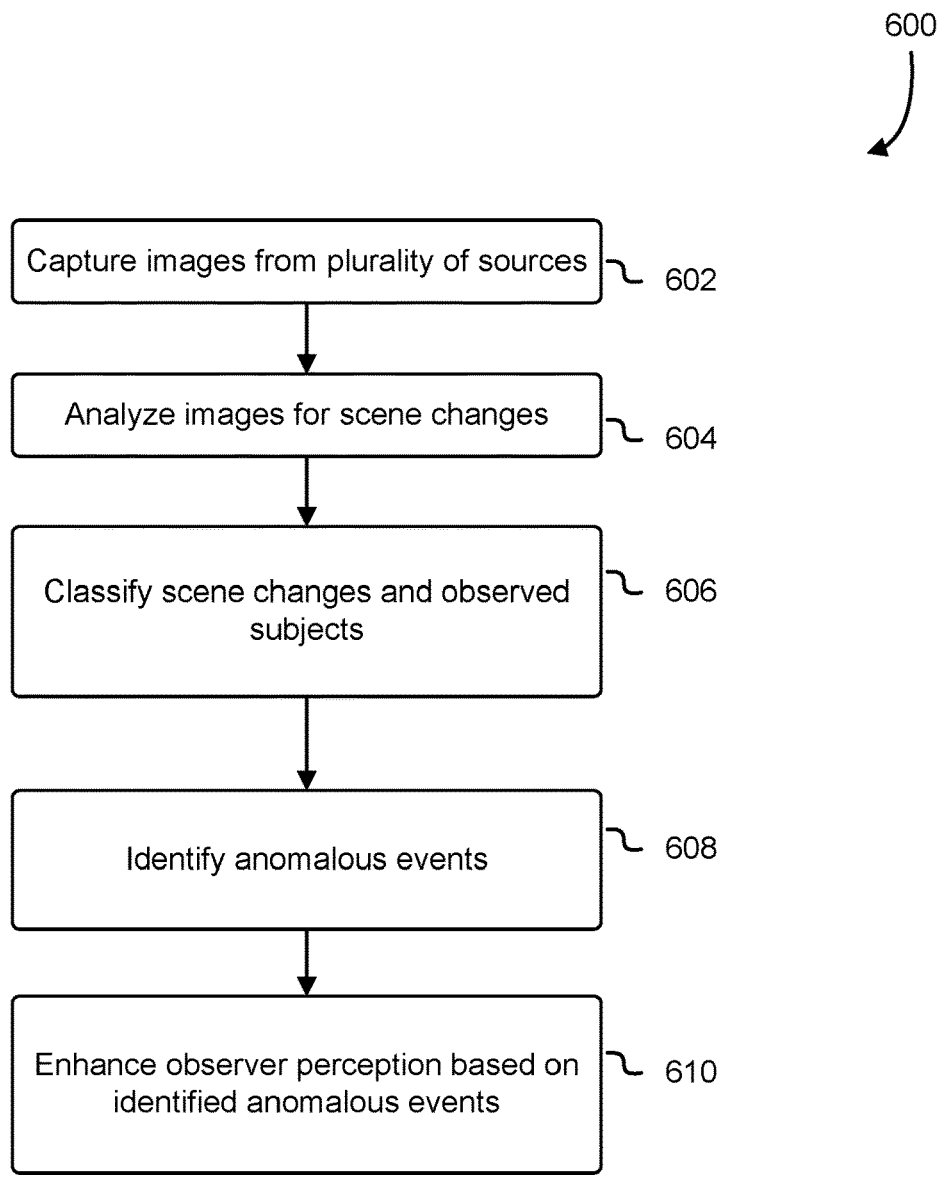
FIG. 6 illustrates further aspects of an example process of enhancing observer perception by anomalous event detection, in accordance with an embodiment.

FIG. 6 illustrates further aspects of an example process of enhancing observer perception by anomalous event detection, in accordance with an embodiment. Some or all of the process 600 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 600 may be performed by any suitable system comprising the observer devices depicted in FIG. 1, and/or other devices, such as a server in a data center, by various components of the environment 1000 described in conjunction with FIG. 10, such as the one or more web servers 1006 or the one or more application servers 1008, by multiple computing devices in a distributed system of a computing resource service provider, or by any electronic client device such as the electronic client device 1002.

In 602, the system captures images from a plurality of sources.

In 604, the system analyzes the images for scene changes. This can include detecting any sudden or unexpected changes in a scene. For example, consider a stationary camera focused on a restricted area within a building. If that room is seldom used, the visual scene will change infrequently. The system can, however, identify unexpected changes in the scene through a variety of techniques. In well-trafficked areas, machine learning or other image analysis techniques may be employed to identify anomalous events, such as fires, collisions, and so forth.

In 606, the system classifies the scene changes, and also classifies any observed subjects in the analyzed images.

In 608, the system identifies anomalous events. This may be considered as a component of the classification stage, and may involve identifying with some level of particularity the type of anomalous event that is believed to have occurred.

In 610, the system enhances observer perception based on the identified anomalous events. For example, a user might be informed, via the display of the user's observer device, of the location of an anomalous event. The user might also be provided, via the observer device, of efficient means of investigating the anomalous event, such as directions for walking or driving to the location.

Figure 7:
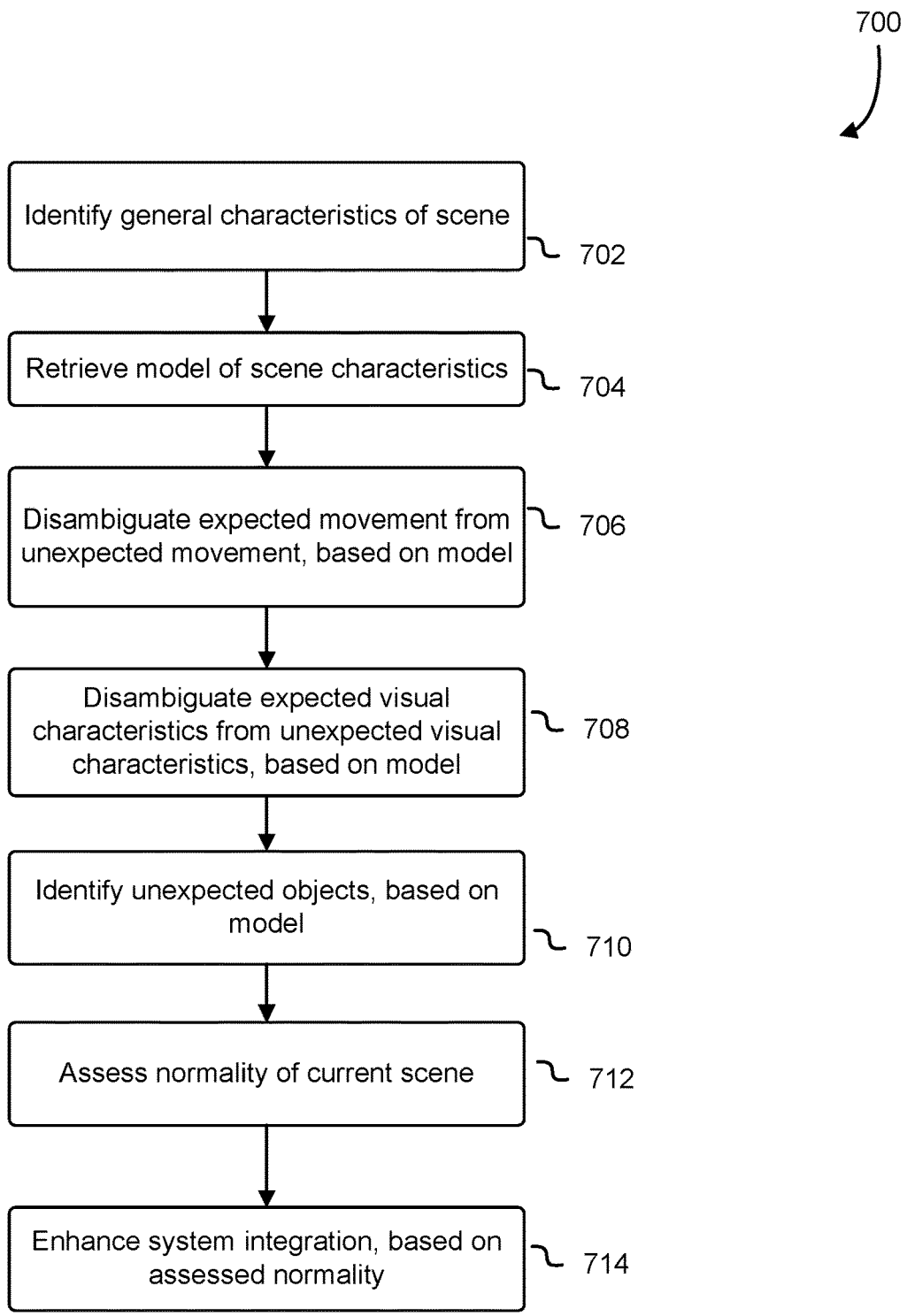
FIG. 7 illustrates an example process for detecting scene changes or scene interest, in accordance with an embodiment.

FIG. 7 illustrates an example process for detecting scene changes or scene interest, in accordance with an embodiment. Some or all of the process 700 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media).

For example, some or all of process 700 may be performed by any suitable system, including but not limited to augmented reality devices comprising a processor and a non-transitory memory on which instructions executable by the processor are stored. The augmented reality system may further comprise components such as those depicted in FIG. 1. In another embodiment, the process 700 is performed by a security camera system. In another embodiment, the process 700 is performed by a system for identifying unusual gameplay activity.

The process 700 includes a series of operations wherein a stream of visual information, i.e., a video stream, is analyzed to determine whether the current activity within the stream is likely to be of interest.

At 702, the system identifies the general characteristics of a scene that is being captured, or will be captured, by a video camera or other device which might acquire video data. This operation may, in some cases, involve a configuration step in which the use selects from a list of potential environments. In another case, the user begins operating the camera under normal conditions, and indicates to the system that the current conditions are considered to be normal.

At 704, the system retrieves, generates, or otherwise obtains a model of scene characteristics.

At 706, the system disambiguates expected movements in the scene from unexpected movements, based on the model. For example, consider a camera trained on a beachfront. This scene would not be static, because of the motion of the waves. However, the model may indicate that the type of motion made by the waves is to be expected. On the contrary, the motions made by a speedboat or an individual paddling a kayak might not be considered normal. Likewise, there may be circumstances where a lack of motion for the scene or a particular object within the scene is considered abnormal.

At 708, the system disambiguates expected visual characteristics from unexpected characteristics, based on the model. For example, the model might indicate what degrees of luminance might be considered normal, or what palette of colors would be normal. Deviation from these norms might be indicative of a fire, or of some other condition.

At 710, the system identifies unexpected objects, based on the model. For example, the model might indicate whether people are expected to be observed in the scene, or whether the observation of a person in the scene is likely to be considered abnormal.

At 712, the system assesses the normality of the current scene, based on the various factors just discussed. In general terms, a "normal" scene is one that conforms to the model, whereas an abnormal scene is one that does not.

At 714, system integration is enhanced, based on the assessed normality. For example, consider an application in which an individual is tasked with monitoring a large number of video feeds. It may be difficult for the individual to determine when anything interesting is happening on any one of these screens, due at least in part to the excess of information provided to the user. Put more simply, it may be difficult for the individual to devote the amount of attention necessary to each of the many screens. The aforementioned process, however, is used to enhance the integrated system. For example, the system may provide a notification of an unexpected or abnormal condition observed by a particular camera, and cause the system that displays the combined output of the numerous screens to highlight the output of the corresponding camera. Alternatively, the system might sound an alarm or provide some other indication.

Embodiments may provide further integration by being responsive to known goals. For example, the models might be adjusted in real time to adapt to the current goal(s) of a user. In one example, firefighters might be responding to a fire. The models used by the system might then be adapted, in real time, to incorporate this fact and provide signaling to indicate when an event of interest is occurring in one of the cameras. For example, the models might be adapted to prioritize recognition of smoke, recognition of individuals who appear to be unconscious or trapped, and so on. Alternatively, the models might adapt to particular events, such as a shift change or the arrival of maintenance personnel.

Embodiments may therefore provide enhanced integration by adapting models (including, in some cases, the thresholds of what is considered normal versus abnormal) in response to input that is based on real-world events, or other events generated by the system that is being integrated with the camera.

Figure 8:
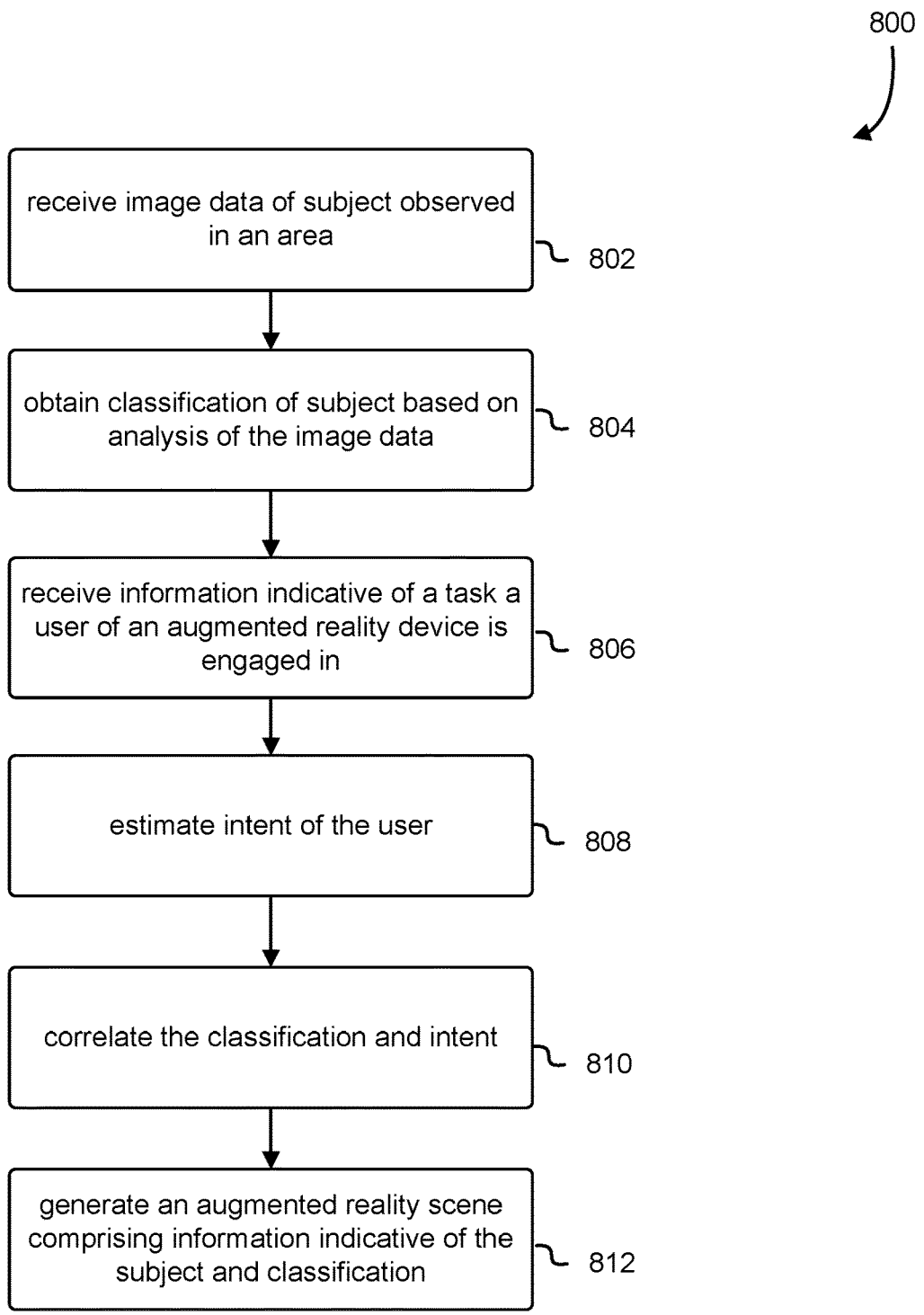
FIG. 8 illustrates an example process for enhancing perception of an augmented reality device user.

FIG. 8 illustrates an example process for enhancing perception of an augmented reality device user. Some or all of the process 800 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 800 may be performed by any suitable system comprising the observer devices depicted in FIG. 1, and/or other devices, such as a server in a data center, by various components of the environment 1000 described in conjunction with FIG. 10, such as the one or more web servers 1006 or the one or more application servers 1008, by multiple computing devices in a distributed system of a computing resource service provider, or by any electronic client device such as the electronic client device 1002.

In an embodiment, one or more servers in a data center implement a framework of augmented reality services, where the framework provides various services such as object detection, identity determination, providing maps and building layout information, and so forth. The functions of the process 800 are implemented, in at least one embodiment, by one or more of these services. The example process 800 is described in relation to an embodiment of an augmented reality services framework. However, as noted, the example process 800 may be implemented on any suitable computing system or device, or any suitable combination of computing systems and devices.

At 802, one or more servers of the augmented reality services framework receive image data of a subject observed in an area. The image may be obtained from an observer device, including one that is separate from an augmented reality device worn by a user.

At 804, one or more servers of the augmented reality services framework obtains a classification of the subject, based on analysis of the image data. In at least one embodiment, the analysis is based on tracking movement of the subject. In at least one embodiment, movement of the subject is tracked upon entry into a restricted area. Authorization to be in an area may be determined by registering the subject's presentation of a "key card" or other indication of authorization, and subsequent tracking of movement. Authorization may also be determined, in at least one embodiment, by a uniform, card key, or other marker worn or carried by the subject. Likewise, absence of one of these factors may indicate a lack of authorization. Similar techniques may be employed to distinguish between employees and visitors.

At 806, one or more servers of the augmented reality services framework receives information indicative of an activity a user of an augmented reality device is engaged in.

For example, a user may be engaged in one or more job functions, such as patrol, emergency response, the provision of assistance, and so forth. This information may be conveyed through a variety of means, as described herein. These means may include, for example, by location of the user, by proximity of the user to another individual, by observation of an object or marking in the user's environment, by tracking a movement route of the user, and so forth.

At 808, one or more servers of the augmented reality services framework estimates an intent of the user of the augmented reality device. This may be determined by means similar to those employed to determine an activity the user is engaged in. In at least one embodiment, intent and activity are treated as corresponding. In at least one embodiment, intent and activity are treated as related, and the inferred activity is used to determine intent.

At 810, one or more servers of the augmented reality services framework correlated the classification of the subject with the estimated intent of the user of the augmented reality device. Correlation refers, in at least one embodiment, to relevance of the classification to the estimated intent, or the activity, in which the user is engaged in. For example, an individual might be classified as "in need of rescue," which would be correlated to the intent of a user engaged in a search and rescue task.

At 812, one or more servers of the augmented reality services framework generates an augmented reality display that includes information indicative of the subject and the classification. For example, visual indicia might be displayed to point in the direction of an individual in need of rescue, to assist an augmented reality device user engaged in a search and rescue task.

Figure 9:
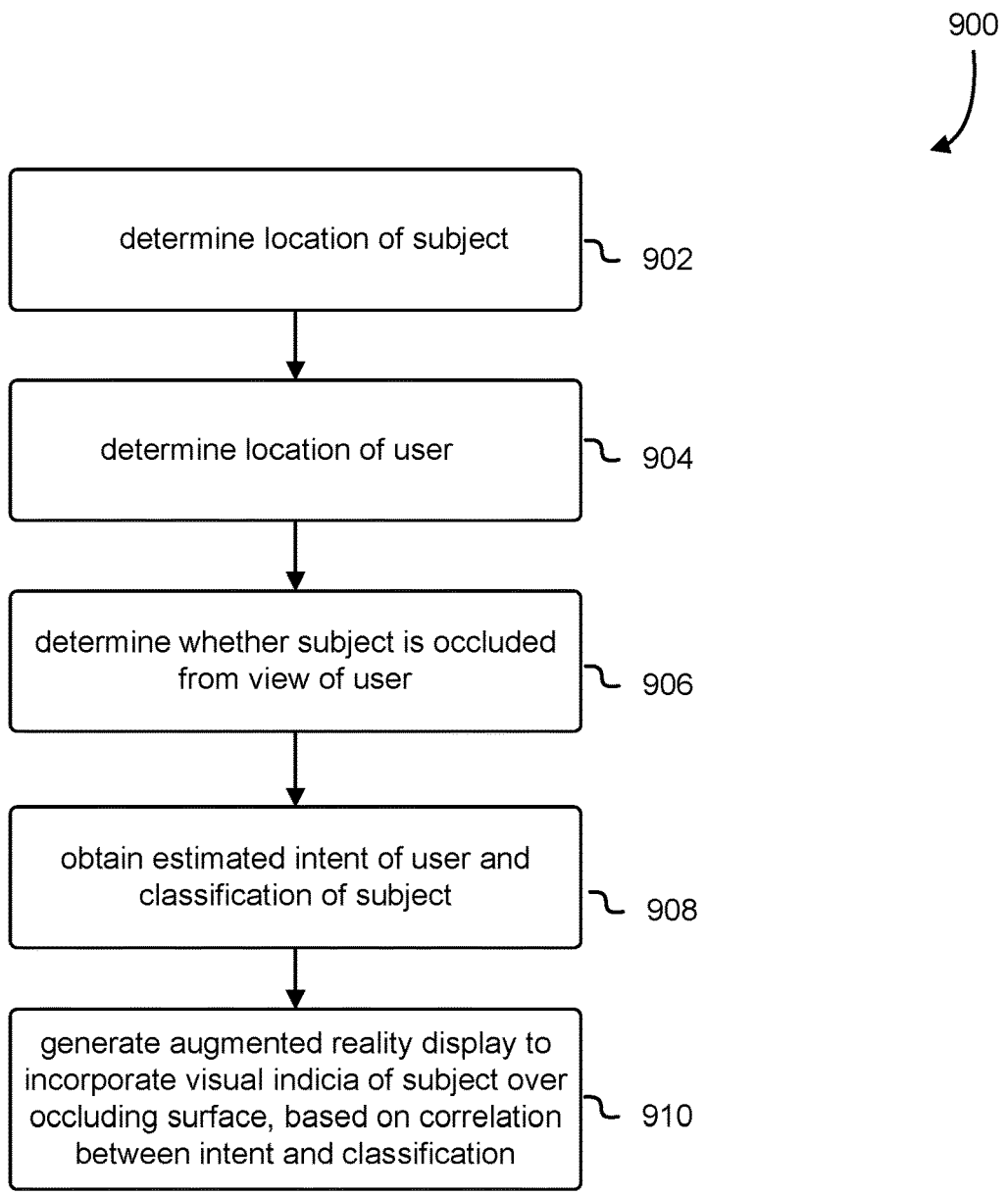
FIG. 9 illustrates an example process for enhancing user perception in the presence of an occluding surface.

FIG. 9 illustrates an example process for enhancing user perception in the presence of an occluding surface. Some or all of the process 900 (or any other processes described, or variations and/or combinations of those processes) may be performed under the control of one or more computer systems configured with executable instructions and/or other data, and may be implemented as executable instructions executing collectively on one or more processors. The executable instructions and/or other data may be stored on a non-transitory computer-readable storage medium (e.g., a computer program persistently stored on magnetic, optical, or flash media). For example, some or all of process 900 may be performed by any suitable system comprising the observer devices depicted in FIG. 1, and/or other devices, such as a server in a data center, by various components of the environment 1000 described in conjunction with FIG. 10, such as the one or more web servers 1006 or the one or more application servers 1008, by multiple computing devices in a distributed system of a computing resource service provider, or by any electronic client device such as the electronic client device 1002.

In an embodiment, one or more servers in a data center implement a framework of augmented reality services, where the framework provides various services such as object detection, identity determination, providing maps and building layout information, and so forth. The functions of the process 800 are implemented, in at least one embodiment, by one or more of these services. However, as noted, the example process 800 may be implemented on any suitable computing system or device, or any suitable combination of computing systems and devices.

At 902, one or more servers of the augmented reality services framework determine a location of a subject observed in a first area.

At 904, one or more servers of the augmented reality services framework determine the location of a user observed in a second area.

At 906, one or more servers of the augmented reality services framework determine whether the subject is occluded from the view of the user of the augmented reality device. In at least one embodiment, this is done by correlating data derived from a first observer device in the subject's area, and a second observer device in the user's area. For example, the system may identify the subject in a first area, where the subject is located, and attempt to identify the same subject in a second area. The second area may be the area in which the augmented reality device is located, and may further correspond to an area which is being directly viewed by the user of the augmented reality device.

At 908, one or more servers of the augmented reality services framework obtain an estimated intent of the user of the augmented reality device, and a classification of the subject. Techniques for estimating user intent and classifying a subject are described herein.

At 910, one or more servers of the augmented reality services framework generate an augmented reality display to incorporate visual indicia of the subject over a surface which occludes the subject from the user's view. The visual indicia is generated based at least in part on a correlation between the intent and the classification. The visual indicia may be projected onto a surface between the two areas, such as over a doorway, gate, arch, or other feature separating the two areas. This technique may serve to call the subject to the user's attention when the user first begins to cross into the subject's area.

In an example embodiment, a system comprises at least one processor and a memory. The memory comprises instructions that, in response to execution by the at least one processor, cause the system to at least receive information indicative of a classification of a subject observed in a first area, wherein the classification is determined, based at least in part, on analysis of image data of the first area; receive information indicative of an intent of a user of an augmented reality device; and generate, in response to a determined correlation between the intent of the user and the classification of the subject, an augmented reality scene comprising visual indicia of the subject and the classification.

In a further aspect of the example embodiment, the memory comprises instructions that, in response to execution by the at least one processor, cause the system to at least determine that the user is in a second area adjacent to the first area and that the subject is occluded from view of the user.

In a further aspect of the example embodiment, the visual indicia is displayed, in the augmented reality scene, in proximity to a barrier between the first area and the second area.

In a further aspect of the example embodiment, the classification indicates whether the subject is authorized or unauthorized to be in the first area.

In a further aspect of the example embodiment, the memory comprises instructions that, in response to execution by the at least one processor, cause the system to at least identify a route taken by the subject; and classify the subject based at least in part on the route.

In a further aspect of the example embodiment, the memory comprises instructions that, in response to execution by the at least one processor, cause the system to at least determine the intent of the user based at least in part on at least one of an object or marking observed in an environment of the user.

In a further aspect of the example embodiment, the determined correlation between the intent of the user and the classification of the subject comprises relevance of the classification to the intent, and wherein the intent corresponds to a job function.

In an example embodiment, a computer-implemented method, comprises receiving image data of a first area; classifying a subject observed in the first area, wherein the classification is based at least in part on analysis of the image data of the first area; determining a correlation between the classification of the subject and a goal of a user of an augmented reality device; and causing, in response to determining the correlation, an augmented reality scene to be generated to comprise a visual indicia of the subject.

In a further aspect of the example embodiment, the computer-implemented method further comprises determining that the user is in a second area adjacent to the first area; and causing the visual indicia to be displayed in proximity to a barrier between the first area and the second area.

In a further aspect of the example embodiment, the subject is occluded from view of the user.

In a further aspect of the example embodiment, the classification indicates whether the subject is authorized or unauthorized to be in the first area.

In a further aspect of the example embodiment, the goal of the user is at least one of patrol, rescue, assistance, or job function.

In a further aspect of the example embodiment, the computer-implemented method further comprises inferring an intent of the subject, based at least in part on application of a machine-learning algorithm to video data of the first area; and determining the classification based at least in part on the intent.

In a further aspect of the example embodiment, the computer-implemented method further comprises identifying a user goal based at least in part on a visual characteristic of the first area.

In a further aspect of the example embodiment, the computer-implemented method further comprises classifying the subject based at least in part on movement of the subject.

In an example embodiment, a non-transitory computer-readable storage medium has stored thereon instructions that, in response to execution by at least one processor of a computer, cause the computer to at least receive information indicative of a classification of a subject observed in a first area, wherein the classification is determined, based at least in part, on analysis of image data of the first area; receive information indicative of a goal of a user, wherein the goal of the user is determined based at least in part on analysis of image data obtained by an augmented reality device associated with the user; and generate, in response to a determined correlation between the goal of the user and the classification of the subject, an augmented reality scene comprising visual indicia based at least in part on the subject and the classification.

In a further aspect of the example embodiment, the goal of the user is inferred by application of a machine-learning algorithm to the image data obtained by the augmented reality device associated with the user.

In a further aspect of the example embodiment, the non-transitory computer-readable storage medium has stored thereon instructions that, in response to execution by at least one processor of the computer, cause the computer to at least generate the augmented reality scene to comprise information associated with an area occluded from view of the user, the information based at least in part on the goal of the user and the classification of the subject.

In a further aspect of the example embodiment, the non-transitory computer-readable storage medium has stored thereon instructions that, in response to execution by at least one processor of the computer, cause the computer to at least receive information indicative of an event identified in a stream of video information, the event identified based at least in part by disambiguating movement predicted by a model from movement not predicted by the model; and generate the augmented reality scene to incorporate a visual indication of the event.

In a further aspect of the example embodiment, the event is identified based at least in part on a determination that an unexpected subject is represented in the stream of video information.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and convey information back to a user of the device. Examples of such client devices include personal computers, cell phones, handheld messaging devices, laptop computers, tablet computers, set-top boxes, personal data assistants, embedded computer systems, electronic book readers, and the like.

The environment 1000 in one embodiment is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than those illustrated in FIG. 10. Thus, the depiction in FIG. 10 should be taken as being illustrative in nature and not limiting to the scope of the disclosure.

The network 1004 can include any appropriate network, including an intranet, the Internet, a cellular network, a local area network, a satellite network or any other network, and/or combination thereof. Components used for such a system can depend at least in part upon the type of network and/or environment selected. Many protocols and components for communicating via such network 1004 are well known and will not be discussed in detail. Communication over the network 1004 can be enabled by wired or wireless connections and combinations thereof. In an embodiment, the network 1004 includes the Internet and/or other publicly-addressable communications network, as the environment 1000 includes one or more web servers 1006 for receiving requests and serving content in response thereto, although for other networks an alternative device serving a similar purpose could be used as would be apparent to one of ordinary skill in the art.

The illustrative environment 1000 includes one or more application servers 1008 and data storage 1010. It should be understood that there can be several application servers, layers or other elements, processes or components, which may be chained or otherwise configured, which can interact to perform tasks such as obtaining data from an appropriate data store. Servers, as used, may be implemented in various ways, such as hardware devices or virtual computer systems. In some contexts, "servers" may refer to a programming module being executed on a computer system. As used, unless otherwise stated or clear from context, the term "data store" or "data storage" refers to any device or combination of devices capable of storing, accessing, and retrieving data, which may include any combination and number of data servers, databases, data storage devices, and data storage media, in any standard, distributed, virtual, or clustered environment.

The one or more application servers 1008 can include any appropriate hardware, software and firmware for integrating with the data storage 1010 as needed to execute aspects of one or more applications for the electronic client device 1002, handling some or all of the data access and business logic for an application. The one or more application servers 1008 may provide access control services in cooperation with the data storage 1010 and is able to generate content including, text, graphics, audio, video, and/or other content usable to be provided to the user, which may be served to the user by the one or more web servers 1006 in the form of HyperText Markup Language (HTML), Extensible Markup Language (XML), JavaScript, Cascading Style Sheets (CSS), JavaScript Object Notation (JSON), and/or another appropriate client-side structured language. Content transferred to the electronic client device 1002 may be processed by the electronic client device 1002 to provide the content in one or more forms including forms that are perceptible to the user audibly, visually, and/or through other senses. The handling of all requests and responses, as well as the delivery of content between the electronic client device 1002 and the one or more application servers 1008, can be handled by the one or more web servers 1006 using PHP: Hypertext Preprocessor (PHP), Python, Ruby, Perl, Java, HTML, XML, JSON, and/or another appropriate server-side structured language in this example. Further, operations described as being performed by a single device may, unless otherwise clear from context, be performed collectively by multiple devices, which may form a distributed and/or virtual system.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The data storage 1010 can include several separate data tables, databases, data documents, dynamic data storage schemes, and/or other data storage mechanisms and media for storing data relating to a particular aspect of the present disclosure. For example, the data storage 1010 may include mechanisms for storing various types of data and user information, which can be used to serve content to the electronic client device 1002. The data storage 1010 also is shown to include a mechanism for storing log data, such as application logs, system logs, access logs, and/or various other event logs, which can be used for reporting, analysis, or other purposes. It should be understood that there can be many other aspects that may need to be stored in the data storage 1010, such as page image information and access rights information, which can be stored in any of the above listed mechanisms as appropriate or in additional mechanisms in the data storage 1010. The data storage 1010 is operable, through logic associated therewith, to receive instructions from the one or more application servers 1008 and obtain, update, or otherwise process data in response thereto. The one or more application servers 1008 may provide static, dynamic, or a combination of static and dynamic data in response to the received instructions. Dynamic data, such as data used in web logs (blogs), shopping applications, news services, and other applications may be generated by server-side structured languages as described or may be provided by a content management system (CMS) operating on, or under the control of, the one or more application servers 1008.

In one embodiment, a user, through a device operated by the user, can submit a search request for a match to a particular search term. In this embodiment, the data storage 1010 might access the user information to verify the identity of the user and obtain information about items of that type. The information then can be returned to the user, such as in a results listing on a web page that the user is able to view via a browser on the electronic client device 1002. Information related to the particular search term can be viewed in a dedicated page or window of the browser. It should be noted, however, that embodiments of the present disclosure are not necessarily limited to the context of web pages, but may be more generally applicable to processing requests in general, where the requests are not necessarily requests for content.

The various embodiments further can be implemented in a wide variety of operating environments, which in some embodiments can include one or more user computers, computing devices, or processing devices that can be used to operate any of a number of applications. User or client devices can include any of a number of computers, such as desktop, laptop, or tablet computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via the network 1004. These devices also can include virtual devices such as virtual machines, hypervisors, and other virtual devices capable of communicating via the network 1004.

Various embodiments of the present disclosure utilize the network 1004 that would be familiar to those skilled in the art for supporting communications using any of a variety of commercially available protocols, such as Transmission Control Protocol/Internet Protocol (TCP/IP), User Datagram Protocol (UDP), protocols operating in various layers of the Open System Interconnection (OSI) model, File Transfer Protocol (FTP), Universal Plug and Play (UpnP), Network File System (NFS), and Common Internet File System (CIFS). The network 1004 can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode (ATM) and Frame Relay are unreliable connection-oriented protocols. Connection-oriented protocols are in contrast to packet-oriented protocols such as UDP that transmit packets without a guaranteed ordering.

In embodiments utilizing the one or more web servers 1006, the one or more web servers 1006 can run any of a variety of server or mid-tier applications, including Hypertext Transfer Protocol (HTTP) servers, FTP servers, Common Gateway Interface (CGI) servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python, or TCL, as well as combinations thereof. The server(s) may also include database servers, including those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment 1000 can include a variety of data stores and other memory and storage media as discussed above. These can reside in a variety of locations, such as on a storage medium local to (and/or resident in) one or more of the computers or remote from any or all of the computers across the network 1004. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, a central processing unit (CPU or processor), an input device (e.g., a mouse, keyboard, controller, touch screen, or keypad), and an output device (e.g., a display device, printer, or speaker). Such a system may also include one or more storage devices, such as disk drives, optical storage devices, and solid-state storage devices such as random access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within a working memory device, including an operating system and application programs, such as a client application or web browser. In addition, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc Read-Only Memory (CD-ROM), digital versatile disk (DVD), or other optical storage, magnetic cassettes, magnetic tape, magnetic disk storage, or other magnetic storage devices, or any other medium which can be used to store the desired information and which can be accessed by the system device. Based on the disclosure and teachings provided, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the invention as set forth in the claims. Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a," "an," "the," and similar referents in the context of describing the disclosed embodiments (especially in the context of the following claims) are to be construed to cover both the singular and the plural, unless otherwise indicated or clearly contradicted by context. The terms "comprising," "having," "including," and "containing" are to be construed as open-ended terms (i.e., meaning "including, but not limited to,") unless otherwise noted. The term "connected," where unmodified and referring to physical connections, is to be construed as partly or wholly contained within, attached to, or joined together, even if there is something intervening. Recitation of ranges of values are merely intended to serve as a shorthand method of referring individually to each separate value falling within the range, unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," is understood with the context as used in general to present that an item, term, etc., may be either A or B or C, or any nonempty subset of the set of A and B and C, unless specifically stated otherwise or otherwise clearly contradicted by context. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described can be performed in any suitable order unless otherwise indicated or otherwise clearly contradicted by context. Processes described (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising instructions executable by one or more processors. The computer-readable storage medium may be non-transitory. In some embodiments, the code is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some embodiments, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some embodiments, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some embodiments, be single devices and, in other embodiments, be distributed computer systems comprising multiple devices that operate differently such that the distributed computer system performs the operations described and such that a single device may not perform all operations.

The use of any examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, although above-described elements may be described in the context of certain embodiments of the specification, unless stated otherwise or otherwise clear from context, these elements are not mutually exclusive to only those embodiments in which they are described; any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A system, comprising:
    at least one processor; and
    a memory comprising instructions that, in response to execution by the at least one processor, cause the system to at least:
        receive information indicative of a classification of a subject observed in a first physical area, wherein the classification is determined, based at least in part, on analysis of image data of the first physical area, the first physical area not visible to a user of an augmented reality device, the user and the augmented reality device in a second physical area;
        receive information indicative of an intent of the user of the augmented reality device;
        determine that the subject in the first physical area is not visible to the user of the augmented reality device in the second physical area; and
        generate, in response to a determined correlation between the intent of the user and the classification of the subject, and in response to the determination that the subject in the first physical area is not visible to the user, an augmented reality scene comprising visual indicia of the subject and the classification.

2. The system of claim 1, the memory comprising instructions that, in response to execution by the at least one processor, cause the system to at least:
    determine, based at least in part on correlation of image data from the first physical area with image data from the second physical area, that the subject is occluded from view of the user.

3. The system of claim 2, wherein the visual indicia is displayed, in the augmented reality scene, in proximity to a barrier between the first physical area and the second physical area.

4. The system of claim 1, wherein the classification indicates whether the subject is authorized or unauthorized to be in the first physical area.

5. The system of claim 1, the memory comprising instructions that, in response to execution by the at least one processor, cause the system to at least:
identify a route taken by the subject; and
classify the subject based at least in part on the route.

6. The system of claim 1, the memory comprising instructions that, in response to execution by the at least one processor, cause the system to at least:
determine the intent of the user based at least in part on at least one of an object or marking observed in an environment of the user.

7. The system of claim 1, wherein the determined correlation between the intent of the user and the classification of the subject comprises relevance of the classification to the intent, and wherein the intent corresponds to a job function.

8. A computer-implemented method, comprising:
receiving image data of a first physical area;
classifying a subject observed in the first physical area, wherein the classification is based at least in part on analysis of the image data of the first physical area;
determining a correlation between the classification of the subject and a goal of a user of an augmented reality device, the user and augmented reality device in a second physical area other than the first physical area;
determining that the subject in the first physical area is not visible to the user in the second physical area; and
causing, in response to determining the correlation and the determining that the subject in the first physical area is not visible to the user, an augmented reality scene to be generated to comprise a visual indicia of the subject.

9. The computer-implemented method of claim 8, further comprising:
determining that the user is in a second area adjacent to the first physical area; and
causing the visual indicia to be displayed in proximity to a barrier between the first physical area and the second physical area.

10. The computer-implemented method of claim 9, wherein the subject is occluded from view of the user.

11. The computer-implemented method of claim 8, wherein the classification indicates whether the subject is authorized or unauthorized to be in the first physical area.

12. The computer-implemented method of claim 8, wherein the goal of the user is at least one of patrol, rescue, assistance, or job function.

13. The computer-implemented method of claim 8, further comprising:
inferring an intent of the subject, based at least in part on application of a machine-learning algorithm to video data of the first physical area; and
determining the classification based at least in part on the intent.

14. The computer-implemented method of claim 8, further comprising:
identifying a user goal based at least in part on a visual characteristic of the first physical area.

15. The computer-implemented method of claim 8, further comprising:
classifying the subject based at least in part on movement of the subject.

16. A non-transitory computer-readable storage medium having stored thereon instructions that, in response to execution by at least one processor of a computer, cause the computer to at least:
receive information indicative of a classification of a subject observed in a first physical area, wherein the classification is determined, based at least in part, on analysis of image data of the first physical area;
receive information indicative of a goal of a user located in another physical area separated from the first physical area, wherein the goal of the user is determined based at least in part on analysis of image data obtained by an augmented reality device associated with the user, wherein the goal is associated with the second physical area; and
generate, in response to a determined correlation between the goal of the user and the classification of the subject, and in response to determining that the subject in the first physical area is not visible to the user, an augmented reality scene comprising visual indicia based at least in part on the subject and the classification.

17. The non-transitory computer-readable storage medium of claim 16, wherein the goal of the user is inferred by application of a machine-learning algorithm to the image data obtained by the augmented reality device associated with the user.

18. The non-transitory computer-readable storage medium of claim 16, having stored thereon instructions that, in response to execution by at least one processor of the computer, cause the computer to at least:
generate the augmented reality scene to comprise information associated with an area occluded from view of the user, the information based at least in part on the goal of the user and the classification of the subject.

19. The non-transitory computer-readable storage medium of claim 16, having stored thereon instructions that, in response to execution by at least one processor of the computer, cause the computer to at least:
receive information indicative of an event identified in a stream of video information, the event identified based at least in part by disambiguating movement predicted by a model from movement not predicted by the model; and
generate the augmented reality scene to incorporate a visual indication of the event.

20. The non-transitory computer-readable storage medium of claim 19, wherein the event is identified based at least in part on a determination that an unexpected subject is represented in the stream of video information.

* * * * *